United States Patent [19]
Sasaki et al.

[11] 3,903,387
[45] Sept. 2, 1975

[54] GAS-INSULATED SWITCHING APPARATUS

[75] Inventors: Kohji Sasaki; Seizo Nakano; Tuneo Kishi, all of Hitachi, Japan

[73] Assignee: Hitachi, Ltd., Japan

[22] Filed: May 15, 1974

[21] Appl. No.: 470,276

[52] U.S. Cl. .............................. 200/148 R; 200/145
[51] Int. Cl. ........................................... H01h 33/82
[58] Field of Search ........ 200/148 B, 148 A, 148 R, 200/145 R

[56] References Cited
UNITED STATES PATENTS

| | | | |
|---|---|---|---|
| 3,033,962 | 5/1962 | Friedrich et al. | 200/148 B |
| 3,214,542 | 10/1965 | Veckley et al. | 200/145 |
| 3,578,927 | 5/1971 | Roth | 200/148 R |
| 3,777,083 | 12/1973 | Olson et al. | 200/148 R |

*Primary Examiner*—Robert S. Macon
*Attorney, Agent, or Firm*—Craig & Antonelli

[57] ABSTRACT

A gas-insulated switching apparatus comprising a breaking section having at least a couple of mutually detachable contacts, a grounded tank containing the breaking section and filled with an insulating gas, the grounded tank being maintained at earth potential, bushings provided on both sides of the grounded tank, bushing tanks which are provided at the lower side of the bushings for supporting the bushings and filled with an insulating gas, and a disconnecting section provided at least in the current paths between the breaking section and at least one of the bushings. An end of the grounded tank is connected with a lead section on the side wall of the tank provided at the lower side of the bushings, and the grounded on the same straight line at the bushing tanks provided at the lower side of the bushings.

10 Claims, 7 Drawing Figures

GAS-INSULATED SWITCHING APPARATUS

BACKGROUND OF THE INVENTION

1. Field of the Invention

This invention relates to a gas-insulated switching apparatus or more in particular to a gas-insulated switching apparatus suitable for a partially gas-insulated extra ultra-high voltage gas switching apparatus employing super bushings with the capacity on the order of 500 KV.

2. Description of the Prior Art

With the increase in demand for electric power in recent years, networks of high power transmission lines have been installed, and such transmission lines are of 500 KV or thereabouts for transmission of high power. This requires switching apparatus of the capacity on the order of 500 KV to be used with the transmission lines. If an air-insulated apparatus is used in the switching apparatus of the capacity on the order of 500 KV, an inter-pole or inter-phase distance of about 8 m is required for each power-applied section, resulting in a very large space needed for installation of the switching apparatus. To obviate this shortcoming, a gas-insulated switching apparatus has been suggested which has a housing incorporating component devices insulated from each other by means of $SF_6$ gas or other medium superior in insulating ability. Such a gas-insulated switching apparatus so far suggested is mainly in the form of an ultra small fully gas-insulated switching apparatus in which even the bus device is completely insulated by the gas. The bus device insulated by gas is much higher in cost than the air-insulated bus device, thus leading to a higher cost of the switching apparatus as a whole. For this reason, another type of gas-insulated switching apparatus has been suggested in which circuit breakers, disconnecting switches, grouding switch and current transformer except for the bus device are gas-insulated. In such a switching apparatus with its bus device air-insulated, it is necessary to provide bushings for connecting the gas-insulated portions with the air-insulated bus device. The insulator used for the bushings is required to be as long as 8 m and the bushings and the bushing tanks mounted on the lower side of the bushings as heavy as 10 tons in the switching apparatus of 500 KV class. Therefore, in order for the grounded tank of the circuit breaker to support the bushings provided on the upper portion of the grounded tank filled with an insulating gas like the conventional gas circuit breaker of the grounded tank type, the strength of the grounded tank must be increased greatly, resulting in an increased weight of the grounded tank. To avoid such a disadvantage, a method of construction which has so far been suggested is to support the bushings directly on the foundation or base separately from the breaking section. Conductors for connecting the bushings with the breaking section, however, are generally taken out sideways of or from the top of a container incorporating the breaking section and that the casing of the taken-out portion of the conductors is curved, the curved portion being provided with a disconnecting section. This configuration is due to the reason that the provision of a device for operation of the disconnecting section as well as the construction is simplified. However, the requirement of providing a curved portion of the casing for forming the disconnecting section undesirably makes the provision of the casing itself complicated and is accompanied by the necessity of provision of an additional casing portion. Especially, for the extra ultra-high voltage of switching apparatus of 500 KV or thereabouts, the diameter of the casing must be considerably large, with the result that an increased weight of the switchsng apparatus leads to a higher cost thereof.

Further, with a view to stable supply of electric power and efficient application thereof, a variety of methods of arrangement of circuit breakers, disconnecting switches, buses and the like of the switching apparatus have been suggested. For each of these various methods of arrangement to be suitable for the conventional gas insulated switching apparatus, each type of the switching apparatus must be differently designed and manufactured at the sacrifice of long time.

SUMMARY OF THE INVENTION

An object of the invention is to provide a gas insulated switching apparatus which is easily constructed.

Another object of the invention is to provide a gas insulated switching apparatus which is capable of being constructed in compact form.

Still another object of the invention is to provide a gas insulated switching apparatus which is easily assembled and the circuit breaker or breaking section of which is easily dismantled and inspected.

A further object of the invention is to provide a gas insulated switching apparatus having devices in a unit which is adaptable to various arrangements of the circuit breaker.

To achieve the above-mentioned objects, the gas insulated switching apparatus according to the invention comprises a breaking section having at least a couple of mutually detachable contacts, a grounded tank filled with an insulating gas and maintained at earth potential, bushings arranged on the same straight line as and on the sides of the grounded tank, a bushing tank mounted on the lower portion of the bushings and having on a side wall thereof a lead to be connected to the end of the grounded tank filled with the insulating gas, and a disconnecting section provided in the current path between the breaking section and at least one of the bushings. As will be noted from the above description, the switching apparatus according to the invention is characterized in that the grounded tank and the bushings are arranged on a straight line and an axial end of the grounded tank is connected to the lead of the bushing tank provided on the lower portion of the grounded tank. This way of arrangement facilitates the construction thereof by eliminating the requirement of an additional casing for the connection between the bushing tank and the grounded tank, while the fact that the grounded tank and the bushings are arranged on a straight line reduces the floor space required for installation of the apparatus. Also, since the disconnecting section is formed inside of the bushing tank on the lower portion of the grounded tank, no special container for the disconnecting section is required, thus making it possible to reduce the size of the apparatus correspondingly.

DESCRIPTION OF THE PREFERRED EMBODIMENTS

Figure 1:
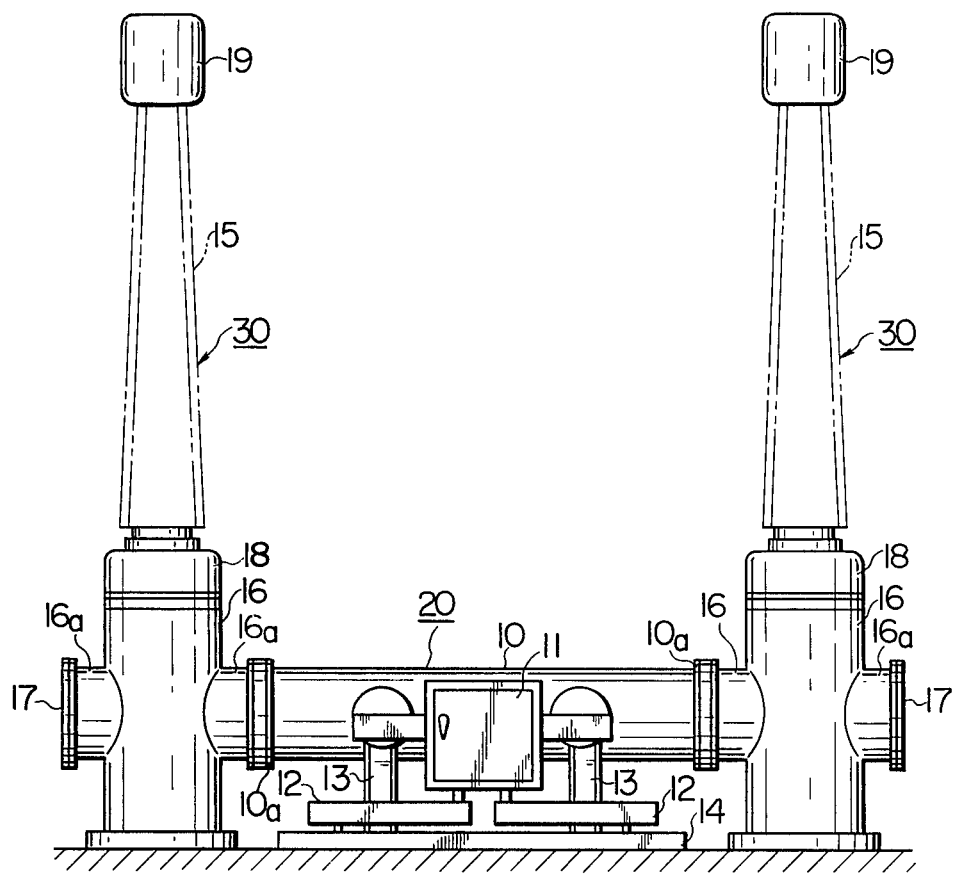
FIG. 1 is a front view of the gas insulated switching apparatus according to an embodiment of the invention.

Referring to FIG. 1, reference numeral 10 shows a grounded tank containing a breaking section inside thereof and filled with an insulating gas. This grounded tank is maintained at earth potential, and on the side thereof is provided an operating device 11 for operating the breaking section, compressed air for operating the operating device 11 is being supplied from a high pressure tank 12. The grounded tank 10 is supported upwardly of the base 14 by means of a support member 13. Bushings 15 are provided on both sides of the grounded tank 10 axially thereof and supported on the bushing tanks 16 mounted on the underside of the bushings 15. The bushings 15 may be supported not on the bushing tanks but directly above by means of a support member separately provided.

A lead 16a is provided on each of the side walls of the bushing tanks and coupled with a flange 10a provided at each end of the grounded tank 10. Each of the leads 16a which is not connected to the grounded tank 10 has a covering 17 whereby the bushing tank 16 is hermetically sealed. This lead 16a not connected to the grounded tank 10 may be omitted. The bushing tanks 16 on the lower portion of the grounded tank are filled with an insulating gas and each has a disconnecting section not shown but explained in detail later. Reference numeral 18 shows current transformers each interposed between the bushing tank 16 and bushings 15, and numeral 19 top shields mounted on the top of the bushings 15. The grounded tank 10, operating device 11 and the air tanks 12 are formed as a breaking section unit 20, whereas the bsuhing 15, the bushing tank 16, current transformer 18 and the disconnecting section make up a bushing unit 30. In other words, in the circuit configuration of FIG. 1, the bushing unit 30 is arranged on each of the sides of the breaking section unit 20 in a straight line. By thus arranging the component elements on a straight line, the space for installation of the gas insulated switching apparatus can be reduced.

Figure 2:
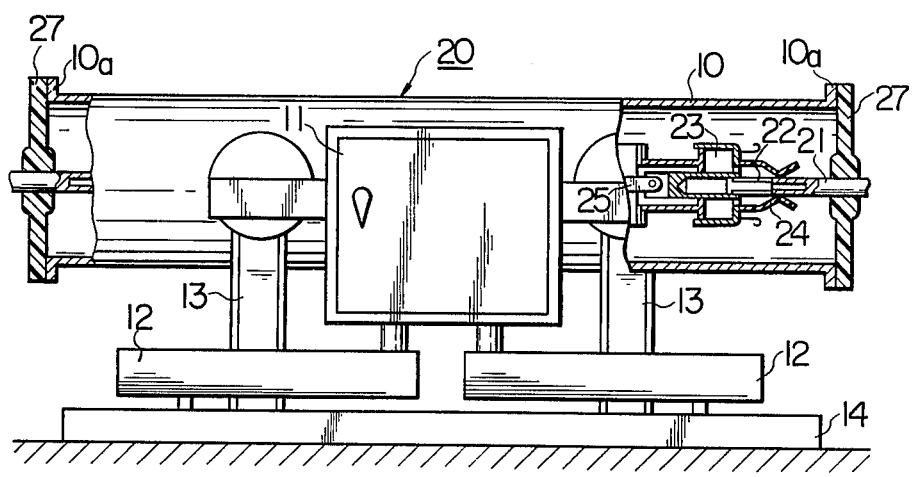
FIG. 2 is a front view including an exploded view showing part of the breaking section unit of the gas insulated switching apparatus in FIG. 1.

The breaking section unit shown in FIG. 1 will be explained in detail with reference to FIG. 2. The breaking section of the breaking section unit 20 comprises a fixed contact 21, a movable contact 22 attachable to and detachable from the fixed contact 21, a puffer device 23 including a puffer cylinder and a puffer piston for compressing the arc quenching gas inside into high pressure, an insulating nozzle 24 for spraying an arc generated between the contacts with the quenching gas compressed by the puffer device 23, and a link device 25 for actuating the movable contact 22 and puffer device 23. A plurality of such breaking sections are arranged by being connected in series inside of the grounded tank 10. The switching apparatus of 500 KV type, for example, has four breaking sections therein. The grounded tank 10 which contains the breaking sections and maintained at the earth potential is filled with the insulating gas. A flange 10a is mounted on each of the axial ends of the grounded tank 10, and coupled with an insulating spacer 27 which supports the fixed contact 21 on the end of the unit. An operating device 11 for operating the breaking section is provided on the outside of the grounded tank 10 and connected with the link device 25 through an insulating operation rod not shown. The operating device 11 is actuated by means of compressed air filled in the high pressure tank 12. The grounded tank 10 is supported above the base 14 by means of the support member 13. The capacity of this breaking section unit 20 is on the order of 500 KV and the axial length of such a unit containing four breaking sections may be as short as 6 m to 7 m.

Figure 3:
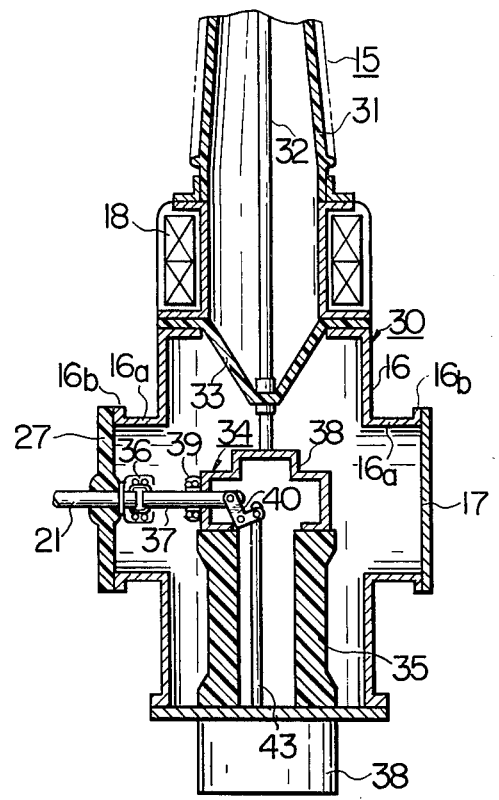
FIG. 3 is a sectional view showing the bushings unit of the gas insulated switching apparatus shown in FIG. 1.

The diagram of FIG. 3 is for describing the bushing unit 30 in detail. In the drawing, reference numeral 15 shows a bushing adapted to be supported on a bushing tank 16. The bushing 15 is a gas bushing comprising an insulator 31 filled with an insulating gas and a conductor 32 disposed along the center axis thereof. On the lower side of the bushing 15, there is provided a current transformer 18 for detecting the current in the central conductor 32. The bushing tank 16 has a lead 16a provided with a falnge 16b adapted to engage the flange 10a at the axial end of the grounded tank 10, so that the bushing tank 16 may be connected to the grounded tank 10 of the breaking section unit 20 through the insulating spacer 27. The central conductor 32 is supported on the insulating spacer 33. In the internal space of the bushing tank 16, a power-applied section of the disconnecting section 34 is supported on the support insulating cylinder 35 while at the same time being insulated from the bushing tank 16. A fixed member 36 of the disconnecting section 34 is supported on the insulating spacer 27, while a movable member 37 is supported by a collector 39 fastened to a bracket 38 supported on the insulating support cylinder 35. This movable member 37 is operated through the insulating operation rod 43 and link device 40 by means of a disconnecting operation device 38 provided on the outside of the bushing tank 16. The bracket 38 is electrically connected to the central conductor 32 of the bushing 15. Although the drawing shows the case in which the operating device 38 is provided on the lower side of the bushing tank 16, it may alternatively be provided on that side wall of the bushing tank 16 which has not any lead 16a. The lead 16a on the side not connected to the breaking section unit 20 has a covering 17 for hermetically sealing the bushing tank 16 filled with the insulating gas. This embodiment is concerned with the construction of the disconnecting section 34 adaptable to the gas insulated switching apparatus shown in FIG. 1, but such a disconnecting section 34 may be additionally provided between the two breaking section units and, as necessary, in the connection with the bushing 15 in the case where the breaking section units 20 are connected to the leads 16a on both sides. These disconnecting sections 34 must be constructed in such a manner as to be operable independently.

Figure 4:
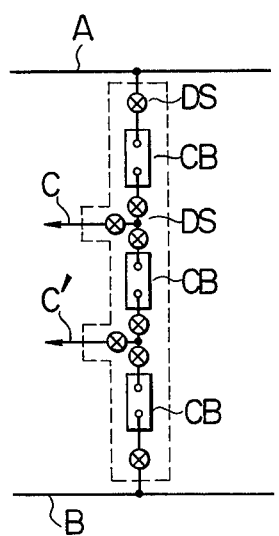
FIG. 4 a skeleton diagram showing an example of circuit arrangement of the switching apparatus.

The connection diagram of FIG. 4 shows an example of the switching apparatus of what is called the 1 ½ circuit breaker type, in which there are three circuit breakers CB provided between the buses A and B, while disconnecting switches DS are mounted on the ends of the breakers CB. Incoming lines C and C' are connected to the junction points between the breakers CB through the disconnecting switches DS respectively. This arrangement, when used as a gas insulated switching apparatus, is so constructed that the portion in the drawing defined by dashed line is insulated by the gas.

Figure 5:
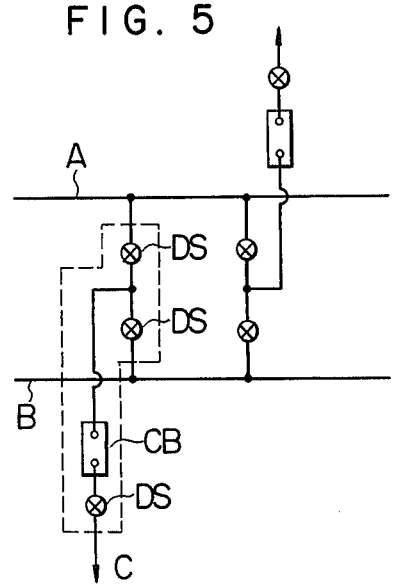
FIG. 5 is a skeleton diagram showing another example of the circuit arrangement of the switching apparatus.

Another example of the circuit breaker is shown in the connection diagram of FIG. 5. This arrangement is called the 1 circuit breaker type and is such that the buses A and B are connected with each other through a couple of disconnecting switches DS, while the junction point between the disconnecting switches DS is connected to the incoming line C through the circuit breaker CB and disconnecting switch DS. In this circuit breaker apparatus, the portion surrounded by a dashed line is insulated by gas.

Figure 6:
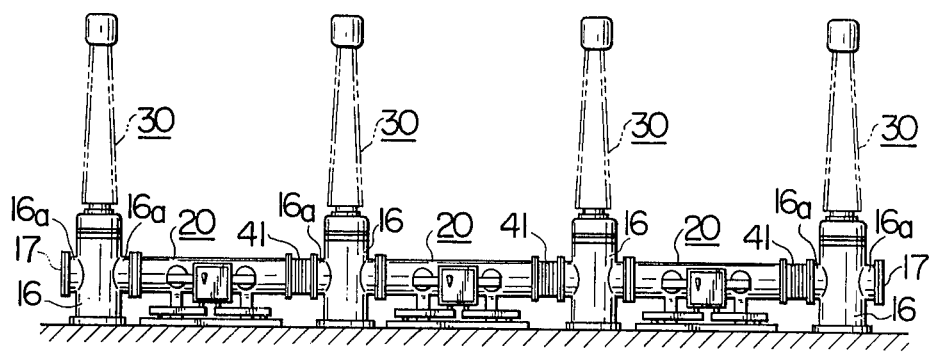
FIG. 6 is a front view showing the gas insulated switching apparatus with the circuit arrangement shown in FIG. 4 according to still another embodiment of the invention.

An actual construction of the circuit breaker of the 1 ½ circuit breaker type of FIG. 4 is shown in FIG. 6. It will be apparent from the drawing that the circuit breaker comprises four bushing units 30 and a plurality of circuit breaker section units 20 disposed therebetween, the bushing units 30 and the circuit breaker section units 20 being arranged on a straight line. One end of each of the circuit breaker section units 20 is connected directly to the lead 16a of the bushing unit 30 on one side, while the other end thereof is connected through the bellows 41 to the lead 16a of the bushing unit 30 on the other side thereby to facilitate the assemblage and dismantling of both the circuit breaker section unit 20 and the bushing unit 30. The circuit breaker section unit 20 and the bushing unit 30 for the circuit breaker with as large a capacity as 500 KV or thereabouts are both so heavy that it cannot be moved easily. To meet such a situation, the bellows 41 has been provided and is contracted and expaned, as the case may be, to effect installation or removal of the units 20 and 30 without unnecessary movement thereof. One of the leads 16a of each of the bushing units 30 located at the ends is provided with a covering 17 to hermetically seal the bushing support tanks 16. The bushing tanks 16 of the bushing units 30 at the ends contain disconnecting sections or switches as shown in FIG. 3, while the bushing tank 16 of each of the other bushing units 30 contains a disconnecting switch for disconnection from the circuit breaker section units 20 at the ends and from the central conductor of the bushing.

Figure 7:
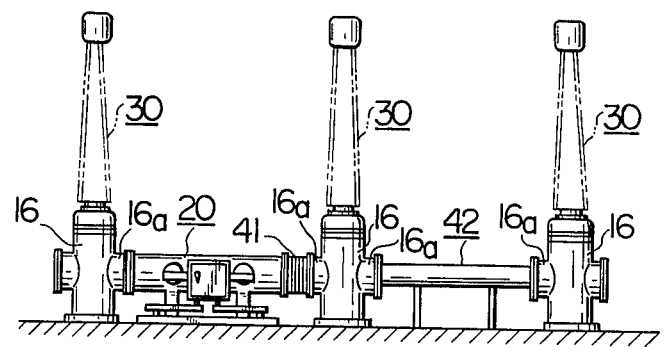
FIG. 7 is a front view showing the gas insulated switching apparatus with the circuit arrangement of FIG. 5 according to a further embodiment of the invention.

A construction of the switching apparatus of the 1 circuit breaker type shown in FIG. 5 is illustrated in FIG. 7. This switching apparatus comprises three bushing units 30 arranged on the same straight line, a breaker section unit 20 arragned between two of the bushing units 30, and a connecting conductor unit 42 interposed between one of the two bushing units 30 and the third of the bushing units 30. This connecting conductor unit 42 comprises the central conductor and a casing containing the central conductor and filled with the insulating gas. The casing has at its ends flanges adapted to engage the leads 16a of the bushing units 30. One of the ends of the breaker section unit 20 is directly connected to the lead 16a of the bushing unit 30, while the other end thereof is connected to the lead 16a through the bellows 41.

The above-mentioned switching apparatus comprising bushing units and breaker section units is very easily constructed in such a manner as to be adaptable to switching apparatus of any type of arrangement. The fact that the bushing units 30 and the breaker section units 20 are arranged in a straight line makes it easy to assemble and combine for construction of a switching apparatus of a desired type.

We claim:

1. A gas-insulated switching apparatus comprising a breaker section with at least a couple of mutually detachable contacts, a grounded tank containing said breaker section and filled with an insulating gas, said grounded tank being maintained at earth potential, a couple of bushings arranged on both sides of said grounded tank, said bushings and said grounded tank being arranged in a straight line, a couple of bushing tanks mounted under said bushings and filled with an insulating gas, said bushing tanks having leads on the side walls thereof for being connected to the ends of said grounded tank, and a disconnecting switch in the current path between said breaker section and at least one of said bushings.

2. A gas-insulated switching apparatus according to claim 1, in which said bushings are supported by means of said bushing tank independently of said grounded tank.

3. A gas-insulated switching apparatus according to claim 1, in which said disconnecting switch is provided within said bushing tank.

4. A gas-insulated switching apparatus according to claim 1, in which an insulating spacer for separating said insulating gas in said grounded tank from said insulating gas in said bushing tank is interposed between said grounded tank and said bushing tank.

5. A gas-insulated switching apparatus according to claim 4, in which said insulating spacer supports a fixed member of said disconnecting switch and a fixed contact of said disconnecting switch.

6. A gas-insulated switching apparatus according to claim 2, in which the bracket of said disconnecting switch is supported on an insulating support cylinder arranged within said bushing tank and a movable member of said disconnecting switch is operated through an insulating rod provided through the inner space of said insulating cylinder.

7. A gas-insultaed switching apparatus according to claim 1, in which a bellows contractible axially of said circuit breaker is interposed between a flange mounted on an axial end of said grounded tank and a lead of said bushing tank.

8. A gas-insulated switching apparatus comprising at least one breaker section unit including a breaker section with at least a couple of mutually detachable contacts and a grounded tank containing said breaker section and filled with an insulating gas, said grounded tank being maintained at earth potential and having an axial end hermetically sealed by an insulating spacer to which a fixed member at the axial end of said breaker section is fastened; and a plurality of bushing units each including a bushing and a bushing tank for supporting said bushing, each of said bushing tanks having leads on the sides of said bushing tanks, one of said leads being adapted to engage said grounded tank of said breaker section unit, said bushing unit having a disconnecting switch formed therein; at least one breaker section unit being combined with a plurality of bushing units each couple of which is arranged on both sides of said breaker section unit, all of said units being arranged in a straight line.

9. A gas-insulated switching apparatus according to claim 8, comprising four bushing units arranged in a straight line and said breaker section units arranged between said bushing units.

10. A gas-insulated switching apparatus according to claim 8, comprising three of said bushing units arranged in a straight line, a breaker section unit interposed between the central one of said bushing units and one of the remaining bushing units, and a connecting conductor unit interposed between said central bushing unit and the other of said remaining bushing units, said connecting conductor unit having a casing containing a central conductor, said casing being filled with an insulating gas and having an end adapted to engage the lead of said bushing tank.

* * * * *